United States Patent
Nishizono et al.

(10) Patent No.: US 8,494,601 B2
(45) Date of Patent: Jul. 23, 2013

(54) COMMUNICATION DEVICE

(75) Inventors: Mitsuhiro Nishizono, Yokohama (JP);
Shin Takahashi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 310 days.

(21) Appl. No.: 12/994,489

(22) PCT Filed: May 28, 2009

(86) PCT No.: PCT/JP2009/059790
§ 371 (c)(1),
(2), (4) Date: Dec. 29, 2010

(87) PCT Pub. No.: WO2009/145264
PCT Pub. Date: Dec. 3, 2009

(65) Prior Publication Data
US 2011/0130102 A1 Jun. 2, 2011

(30) Foreign Application Priority Data
May 28, 2008 (JP) ................................. 2008-139942

(51) Int. Cl.
*H04B 1/38* (2006.01)
*H04B 5/00* (2006.01)

(52) U.S. Cl.
USPC .................. 455/575.3; 455/575.7; 455/41.1; 455/41.2; 455/41.3; 455/121; 455/123; 455/193.1; 455/269

(58) Field of Classification Search
USPC ................ 455/575.3, 575.7, 41.1, 41.2, 41.3, 455/121, 123, 193.1, 269
See application file for complete search history.

(56) References Cited

U.S. PATENT DOCUMENTS

| 8,219,143 B2 * | 7/2012 | Waku et al. ................ 455/552.1 |
| 2001/0029173 A1 * | 10/2001 | Ogino ........................ 455/279.1 |

(Continued)

FOREIGN PATENT DOCUMENTS

| JP | 2004-134975 A | 4/2004 |
| JP | 2007-104637 A | 4/2007 |

(Continued)

OTHER PUBLICATIONS

Office Action from a foreign patent office for a counterpart foreign application dated Jul. 31, 2012.

(Continued)

*Primary Examiner* — Wen Huang
(74) *Attorney, Agent, or Firm* — Hoffmann & Baron, LLP (57) ABSTRACT

The communication device includes: a first body; a second body; a connecting portion that connects the first body and the second body, so as to be capable of switching between a closed state in which the first body and the second body are superimposed with each other, and an opened state in which a degree of mutual superimposition is smaller than that of the closed state; a first conductive portion that is disposed in the first body; a second conductive portion that is disposed in the second body; a signal line that electrically connects the first conductive portion and the second conductive portion via the inside of the connecting portion; a first antenna, which is disposed in at least one of the first body and the second body, and which is electrically connected to the first conductive portion or the second conductive portion; and a second antenna, which is disposed in at least one of the first body and the second body, and which is capacitively coupled with the first conductive portion or the second conductive portion.

18 Claims, 8 Drawing Sheets

U.S. PATENT DOCUMENTS

| | | | |
|---|---|---|---|
| 2004/0121739 A1* | 6/2004 | Suzuki et al. | 455/84 |
| 2006/0116168 A1* | 6/2006 | Kushima | 455/558 |
| 2006/0118625 A1* | 6/2006 | Sekita | 235/451 |
| 2007/0057797 A1* | 3/2007 | Waldner et al. | 340/572.7 |

FOREIGN PATENT DOCUMENTS

| | | |
|---|---|---|
| JP | 2008-85988 A | 4/2008 |
| JP | 2008-109506 A | 5/2008 |
| WO | 2006/112160 A | 10/2006 |

OTHER PUBLICATIONS

English translation of the Office Action from a foreign patent office for a counterpart foreign application dated Jul. 31, 2012.

* cited by examiner

COMMUNICATION DEVICE

CROSS-REFERENCE TO RELATED APPLICATIONS

The present application is the national stage of International Application No. PCT/JP2009/059790, filed May 28, 2009, which claims priority to Japanese Application No. 2008-139942, filed May 28, 2008, the entire contents of which are incorporated by reference herein.

TECHNICAL FIELD

The present invention relates to a communication device having an antenna.

BACKGROUND ART

A current mainstream communication device employs a configuration, in which a first body as an operation unit side used for operations by a user is connected via a hinge mechanism to a second body as a display side used for displaying a variety of information, and the bodies can be relatively moved around a rotational axis of the hinge mechanism so as to switch between an opened state and a closed state. Moreover, in such a communication device, a main antenna for a telephone call and/or data communication is disposed in one end of the first body or one end of the second body.

In addition, a technique is known in a communication device, for example, as disclosed in Patent Document 1, a reference potential portion (GND) of a circuit board built into the first body and a reference potential portion (GND) of a circuit board built into the second body are capacitively coupled. In this way, a reference potential (GND) of the entire device is stabilized at high frequency, and deterioration of the gain of the main antenna is prevented.

Here, the communication terminal according to Patent Document 1 includes: a first body; a second body; a connecting portion that connects the first body and the second body, so as to be capable of switching between a closed state in which the first body and the second body are superimposed with each other, and an opened state in which a degree of mutual superimposition is smaller than that of the closed state; conductive portions (circuit boards) that are disposed in the first body and the second body; and a first antenna that is disposed in the vicinity of the connecting portion. Furthermore, in order to capacitively couple the conductive portion in the first body and the conductive portion in the second body, the distance between them is no more than a predetermined distance L.

Patent Publication 1: Japanese Unexamined Patent Application Publication No. 2004-134975

DISCLOSURE OF THE INVENTION

Problems to be Solved by the Invention

However, in order to capacitively couple the conductive portion built into the first body and the conductive portion built into the second body, the distance between them has to be no more than the predetermined distance L. As a result, the degree of freedom in designing a communication terminal is restricted.

The present invention has been made in view of the above-mentioned problem, and an object thereof is to provide a communication device that is capable of improving the gain of the first antenna, while reducing factors that hinder freedom of design.

Means for Solving the Problems

In order to solve the aforementioned problem, a communication device according to a first aspect of the present invention is characterized by including: a first body; a second body; a connecting portion that connects the first body and the second body, so as to be capable of switching between a closed state in which the first body and the second body are superimposed with each other, and an opened state in which a degree of mutual superimposition is smaller than that of the closed state; a first conductive portion that is disposed in the first body; a second conductive portion that is disposed in the second body; a signal line that electrically connects the first conductive portion and the second conductive portion via the inside of the connecting portion; a first antenna, which is disposed in at least one of the first body and the second body, and which is electrically connected to the first conductive portion or the second conductive portion; and a second antenna, which is disposed in at least one of the first body and the second body, and which is capacitively coupled with the first conductive portion or the second conductive portion.

According to a second aspect of the present invention, in the communication device as recited in the first aspect, it is preferable that the first antenna is configured to transmit or receive a signal related to a first frequency band, and a high-order secondary resonance point of the second antenna is included in the first frequency band.

According to a third aspect of the present invention, in the communication device as recited in the first aspect, it is preferable that the first antenna is configured to transmit or receive a signal related to a first frequency band, the second antenna is configured to transmit or receive a signal related to a second frequency band of which high-order secondary resonance point is not included in the first frequency band, the communication device comprises an adjusting unit for performing adjustment of the second frequency band, and the adjusting unit performs adjustment of the second frequency band such that a high-order resonance point of the second antenna is included in the first frequency band.

According to a fourth aspect of the present invention, the communication device as recited in the third aspect preferably includes a detecting unit that detects the opened state, and it is preferable that, when the detecting unit detects the opened state, the adjusting unit performs adjustment of the second frequency band such that the high-order resonance point of the second antenna is included in the first frequency band.

According to a fifth aspect of the present invention, the communication device as recited in the fourth aspect preferably includes a detecting unit that detects the closed state, and it is preferable that, when the detecting unit detects the closed state, the adjusting unit suppresses the adjustment.

According to a sixth aspect of the present invention, the communication device as recited in the third aspect preferably includes a first controlling unit that performs first predetermined control based on the signal related to the first frequency band transmitted or received via the first antenna, and it is preferable that, when the first controlling unit performs the first predetermined control, the adjusting unit performs adjustment of the second frequency band such that the high-order resonance point of the second antenna is included in the first frequency band.

According to a seventh aspect of the present invention, in the communication device as recited in the sixth aspect, it is preferable that, when the first controlling unit suppresses the first predetermined control, the adjusting unit suppresses the adjustment.

According to an eighth aspect of the present invention, the communication device as recited in the third aspect preferably includes a first intensity measuring unit that measures intensity of the signal related to the first frequency band transmitted or received via the first antenna, and it is preferable that, when the first intensity measuring unit measures intensity with a value higher than a predetermined value, the adjusting unit performs adjustment of the second frequency band such that the high-order resonance point of the second antenna is included in the first frequency band.

According to a ninth aspect of the present invention, in the communication device as recited in the eighth aspect, it is preferable that, when the first intensity measuring unit measures intensity with a value lower than a predetermined value, the adjusting unit suppresses the adjustment.

According to a tenth aspect of the present invention, the communication device as recited in the third aspect preferably includes a first intensity measuring unit that measures intensity of the signal related to the first frequency band transmitted or received via the first antenna, and it is preferable that, when the first intensity measuring unit measures intensity with a value lower than a predetermined value, the adjusting unit performs adjustment of the second frequency band such that the high-order resonance point of the second antenna is included in the first frequency band.

According to an eleventh aspect of the present invention, in the communication device as recited in the tenth aspect, it is preferable that, when the first intensity measuring unit measures intensity with a value higher than a predetermined value, the adjusting unit suppresses the adjustment.

According to a twelfth aspect of the present invention, the communication device as recited in the third aspect preferably includes a second controlling unit that performs second predetermined control based on the signal related to the second frequency band transmitted or received via the second antenna, and it is preferable that, in a state in which the second controlling unit is not performing the second predetermined control, the adjusting unit performs adjustment of the second frequency band such that the high-order resonance point of the second antenna is included in the first frequency band.

According to a thirteenth aspect of the present invention, in the communication device as recited in the twelfth aspect, it is preferable that, in a state in which the second controlling unit is performing the second predetermined control, the adjusting unit suppresses the adjustment.

According to a fourteenth aspect of the present invention, the communication device as recited in the third aspect preferably includes a second intensity measuring unit that measures intensity of the signal related to the second frequency band transmitted or received via the second antenna, and it is preferable that, when the second intensity measuring unit measures intensity with a value lower than a predetermined value, the adjusting unit performs adjustment of the second frequency band such that the high-order resonance point of the second antenna is included in the first frequency band.

According to a fifteenth aspect of the present invention, in the communication device as recited in the fourteenth aspect, it is preferable that, when the second intensity measuring unit measures intensity with a value higher than a predetermined value, the adjusting unit suppresses the adjustment.

According to a sixteenth aspect of the present invention, the communication device as recited in the third aspect preferably includes a second intensity measuring unit that measures intensity of the signal related to the second frequency band transmitted or received via the second antenna, and it is preferable that, when the second intensity measuring unit measures intensity with a value higher than a predetermined value, the adjusting unit performs adjustment of the second frequency band such that the high-order resonance point of the second antenna is included in the first frequency band.

According to a seventeenth aspect of the present invention, in the communication device as recited in the sixteenth aspect, it is preferable that, when the second intensity measuring unit measures intensity with a value lower than a predetermined value, the adjusting unit suppresses the adjustment.

According to an eighteenth aspect of the present invention, in the communication device as recited in the first aspect, it is preferable that the first antenna is disposed in the first body.

Effects of the Invention

According to the present invention, the gain of the main antenna can be improved, while reducing factors that hinder freedom of design.

EXPLANATION OF REFERENCE NUMERALS 1 cellular telephone device
2 operation unit side body
2a front panel
2b front case
2c rear case
2d rear panel
3 display unit side body
3c rear case
3a front panel
3b front case
3c rear case
3d rear panel
4 hinge mechanism
4a hinge mechanism
4b hinge mechanism
4c metal hinge 50 printed circuit board
55 antenna element
56 antenna for short distance communication
70a, 70b speaker
75 motor
80 printed circuit board

PREFERRED MODE FOR CARRYING OUT THE INVENTION

Embodiments of the present invention are hereinafter described with reference to the drawings. It should be noted that, although a cellular telephone device is hereinafter described as an example of a communication device, the present invention is not limited thereto, and it may be other communication devices including an antenna, e.g. a PHS (Personal Handyphone System, registered trademark), a PDA (Personal Digital Assistant), a portable navigation device, a notebook computer, etc.

First Embodiment

Figure 1:
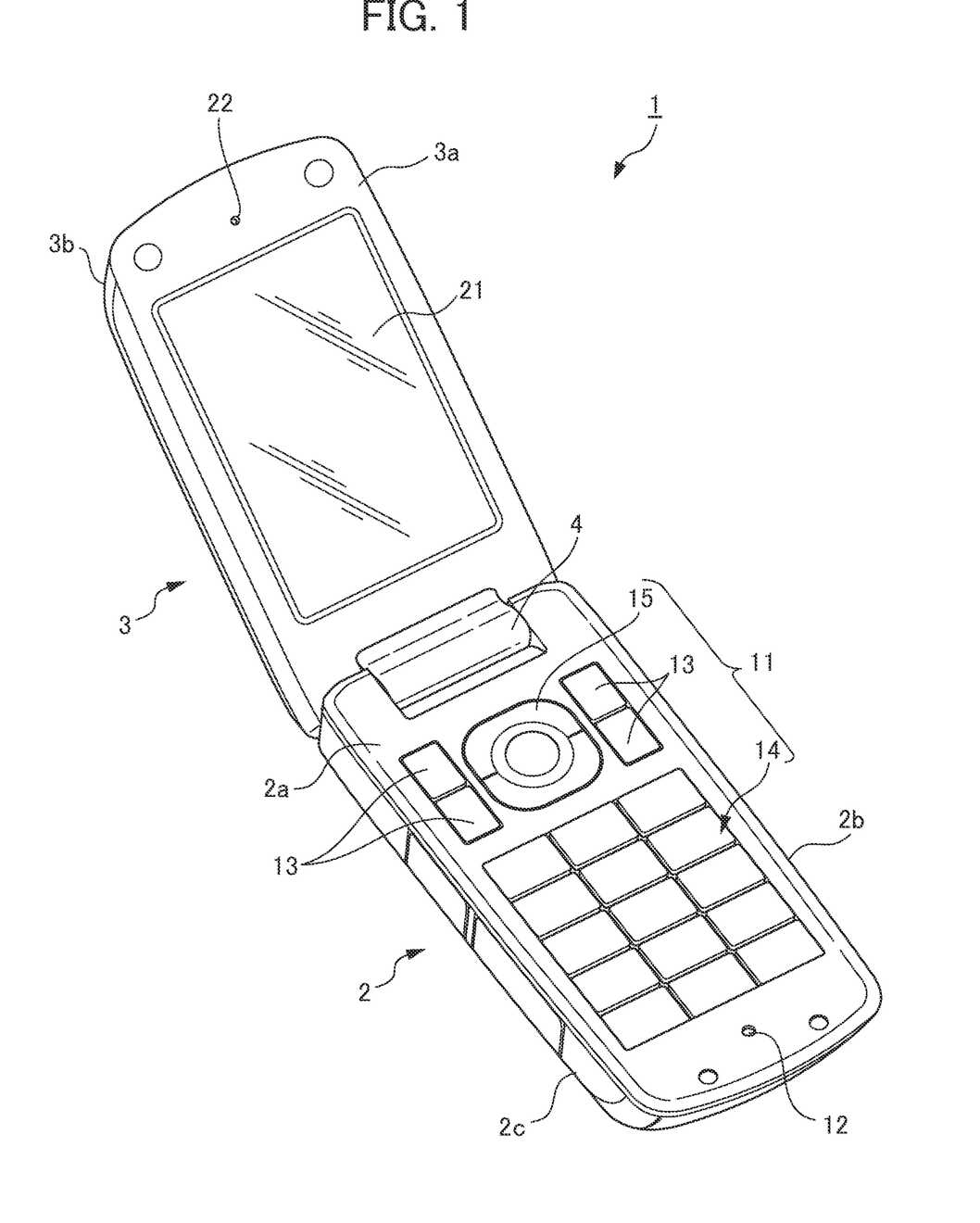
FIG. 1 is a perspective view showing an appearance of a cellular telephone device 1 according to the present invention.

FIG. 1 is a perspective view showing an appearance of a cellular telephone device 1 as an example of a communication device according to the present invention, communicating with a host device. Moreover, FIG. 2 is a perspective view showing a state in which the cellular telephone device 1 is folded.

Figure 2:
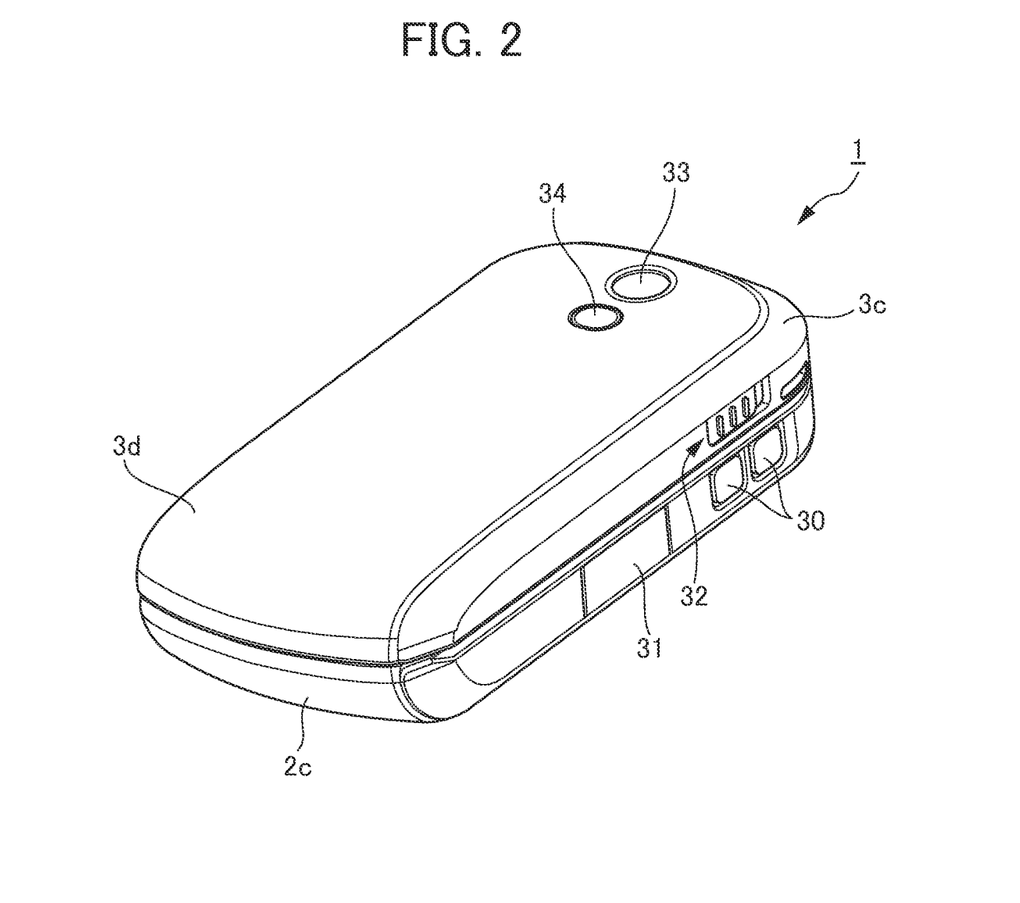
FIG. 2 is a perspective view showing a state in which the cellular telephone device 1 is folded.

As shown in FIGS. 1 and 2, the cellular telephone device 1 includes: an operation unit side body 2 (second body), a surface of which is configured with a front panel 2a, a front case 2b, a rear case 2c and a rear panel 2d (not shown); and a display unit side body 3 (first body), a surface of which is configured with a front panel 3a, front case 3b, a rear case 3c and a rear panel 3d.

The operation unit side body 2 is configured to expose, on the surface of the front panel 2a, an operation button set 11 and a sound input unit 12 to which sounds, which a user of the cellular telephone device 1 produces during a phone call, are input. The operation button set 11 includes: feature setting operation buttons 13 for operating various settings and various features such as a telephone number directory feature and a mail feature; input operation buttons 14 for inputting digits of a telephone number and characters for mail; and a selection operation button 15 that performs selection of the various operations and scrolling. In addition, a cap covering the interface to communicate with an external device (for example, a host device) is provided on a side face of the operation unit side body 2.

Furthermore, the display unit side body 3 is configured to expose, on the front panel 3a, a display 21 for displaying a variety of information and a receiver 22 for outputting sound of the other party of a conversation.

Furthermore, as shown in FIG. 1, an upper end portion of the operation unit side body 2 and a lower end portion of the display unit side body 3 are connected via a hinge mechanism 4 (connecting portion). Moreover, by relatively moving the operation unit side body 2 and the display unit side body 3 connected via the hinge mechanism 4, the cellular telephone device 1 can be in a state where the surface of the operation unit side body 2 and the surface of the display unit side body 3 are contacting each other so as to be folded (a first state or an closed state where the bodies are superimposed with each other), and in a state where the surface of the operation unit side body 2 and the surface of the display unit side body 3 are apart from each other so as to be exposed to the outside (a second state or an opened state where the degree of mutual superimposition is smaller than that of the folded state). It should be noted that, although the cellular telephone device 1 that is foldable via the hinge mechanism 4 is described in the present embodiment, instead of such a flip type, the cellular telephone device 1 may be of: a slider type in which one body slides to one direction from a state in which both of the bodies 2 and 3 are mutually superimposed; a rotating type in which one body is rotated around an axis line along the direction of the superimposition; or a type in which both of the bodies 2 and 3 are connected via a t-axis hinge.

As shown in FIG. 2, the operation unit side body 2 includes, on one side face thereof, side keys 30 to which predetermined functions are assigned, and a cap 31 for an interface where external memory is inserted and removed. In addition, the display unit side body 3 includes a sliding key 32 on one side face thereof as described later in detail. Furthermore, a camera unit 33 that takes an image of a subject and a light unit 34 that irradiates light on the subject are formed so as to be exposed on the rear panel 3d of the display unit side body 3. It should be noted that the camera unit 33 and the light unit 34 configure a camera module.

Figure 3:
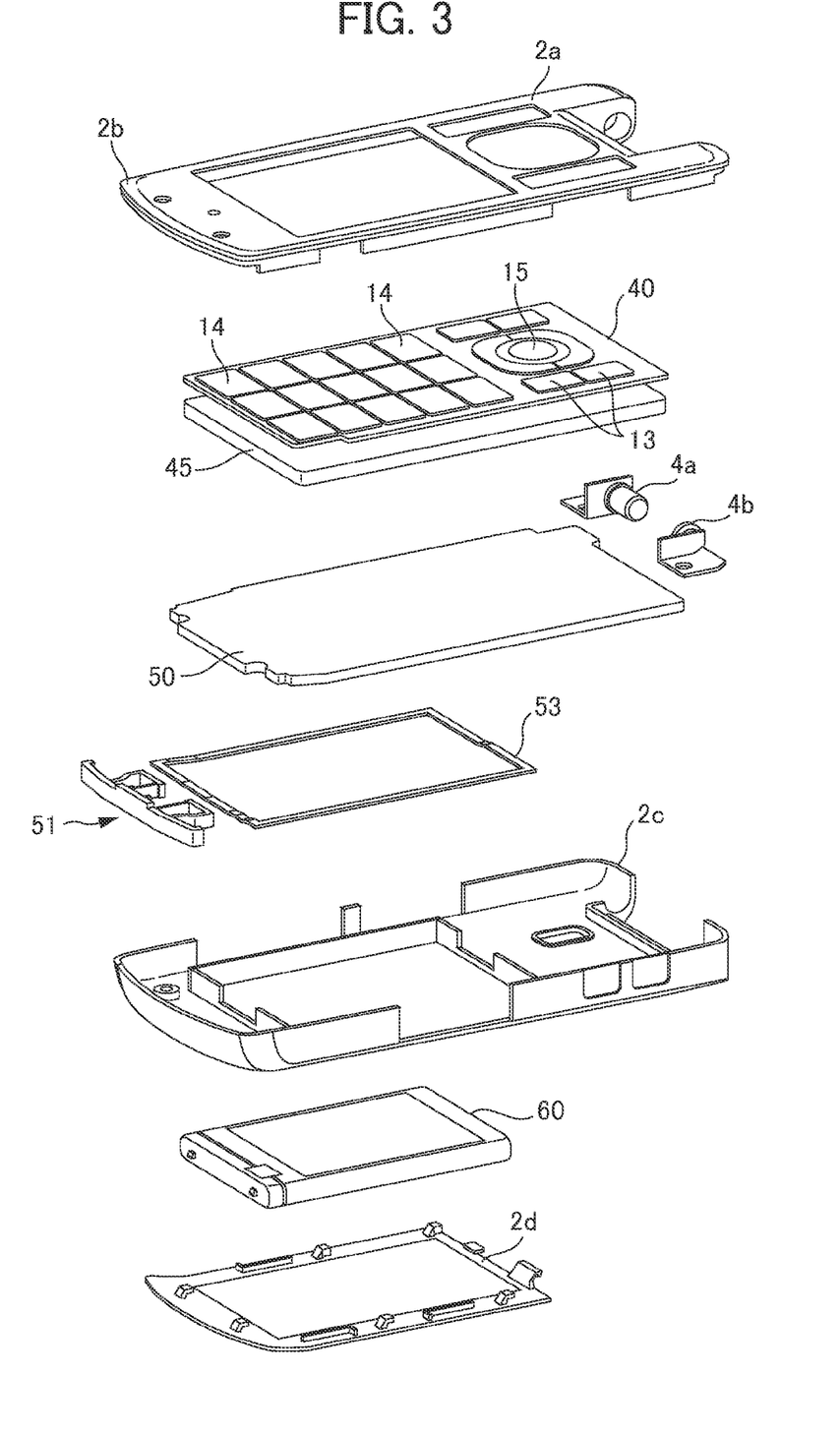
FIG. 3 is an exploded perspective view of members built into an operation unit side body 2.

Moreover, FIG. 3 is an exploded perspective view of members built into the operation unit side body 2. As shown in FIG. 3, the operation unit side body 2 includes: the front panel 2a; the front case 2b (the front panel 2a and the front case 2b are connected in this drawing); a key sheet 40 constituting the aforementioned operation button set 11; a flexible wiring board 45; a printed circuit board 50 (second conductive portion) including various electronic components such as a reference potential pattern layer and an RF (Radio Frequency) module; hinge mechanisms 4a and 4b; a main antenna 51 (first antenna); the magnetic field antenna 53 (second antenna); the rear case 2c; and the rear panel 2d protecting a rechargeable battery 60.

In addition, the front case 2b, the key sheet 40, the printed circuit board 50 and the rear case 2c are disposed to be stacked in the operation unit side body 2. Furthermore, the rechargeable battery 60 is accommodated to be detachable from the outside of the rear panel 2b.

As shown in FIG. 3, the front case 2b and the rear case 2c are disposed such that concave inner surfaces thereof face each other, and are connected such that peripheries thereof are superimposed with each other. Moreover, the key sheet 40 and the printed circuit board 50 are built in and interposed between the front case 2b and the rear case 2c. In other words, the key sheet 40 is disposed to be stacked on a top face of the printed circuit board 50.

The flexible wiring board 45 has a plurality of key switches on its plane to the side of the front panel 2a, and each of the key switches has a structure of a metal dome made of a metal plate that is three-dimensionally curved like a bowl. When an apex of the bowl-shaped metal dome is depressed, contact is made with a switch terminal formed on an electric circuit (not shown) printed on the surface of the flexible wiring board 45, thereby establishing an electrical connection. It should be noted that the flexible wiring board 45 is formed by interposing wirings between a plurality of insulating films.

In addition, various electronic components (not shown) are disposed on the printed circuit board 50. The various electronic components form a plurality of circuit blocks by way of predetermined combinations. For example, various circuit blocks including a radio circuit, a power supply circuit, a digital circuit and the like are formed.

A plurality of key holes are formed in the inner surface of the front panel 2a, which is opposed to the display 21 of the display unit side body 3 in a state in which the cellular telephone device 1 is folded. Depression faces of the function setting operation buttons 13, the input operation buttons 14 and the selection operation button 15, which are formed on the key sheet 40, are exposed from the plurality of key holes, respectively. By pushing so as to depress a depression face of the function setting operation buttons 13, the input operation buttons 14 and the selection operation button 15, which constitute the exposed operation button set 11, an apex of a metal dome (a bowl shape) in the corresponding key switch is depressed, thereby contacting a switch terminal and establishing electrical conduction.

The main antenna 51 accommodated in a base is disposed to one end side of the rear case 2C. In other words, the antenna unit 51 is disposed to one end side in the cellular telephone device 1. More specifically, the main antenna 51 is disposed to the end portion side that is opposite to the hinge mechanism 4 side in the cellular telephone device 1. Moreover, the main antenna 51 is formed of belt-shaped sheet metal.

The main antenna 51 (first antenna) is an antenna that performs transmission and reception of electromagnetic waves concerning a telephone call or E-mail, and is configured to be powered by the printed circuit board 50 via a feed terminal (not shown). As a result, the main antenna 51 is powered by the printed circuit board 50 via the feed terminal, and is connected to RF modules and the like provided on the printed circuit board 50. It should be noted that, although the position of the main antenna 51 is set at one end of the rear case 2c in the present embodiment, the main antenna 51 may be disposed at any position inside the operation unit side body 2. In addition, the main antenna 51 may be disposed at any position inside the display unit side body 3.

Figure 4:
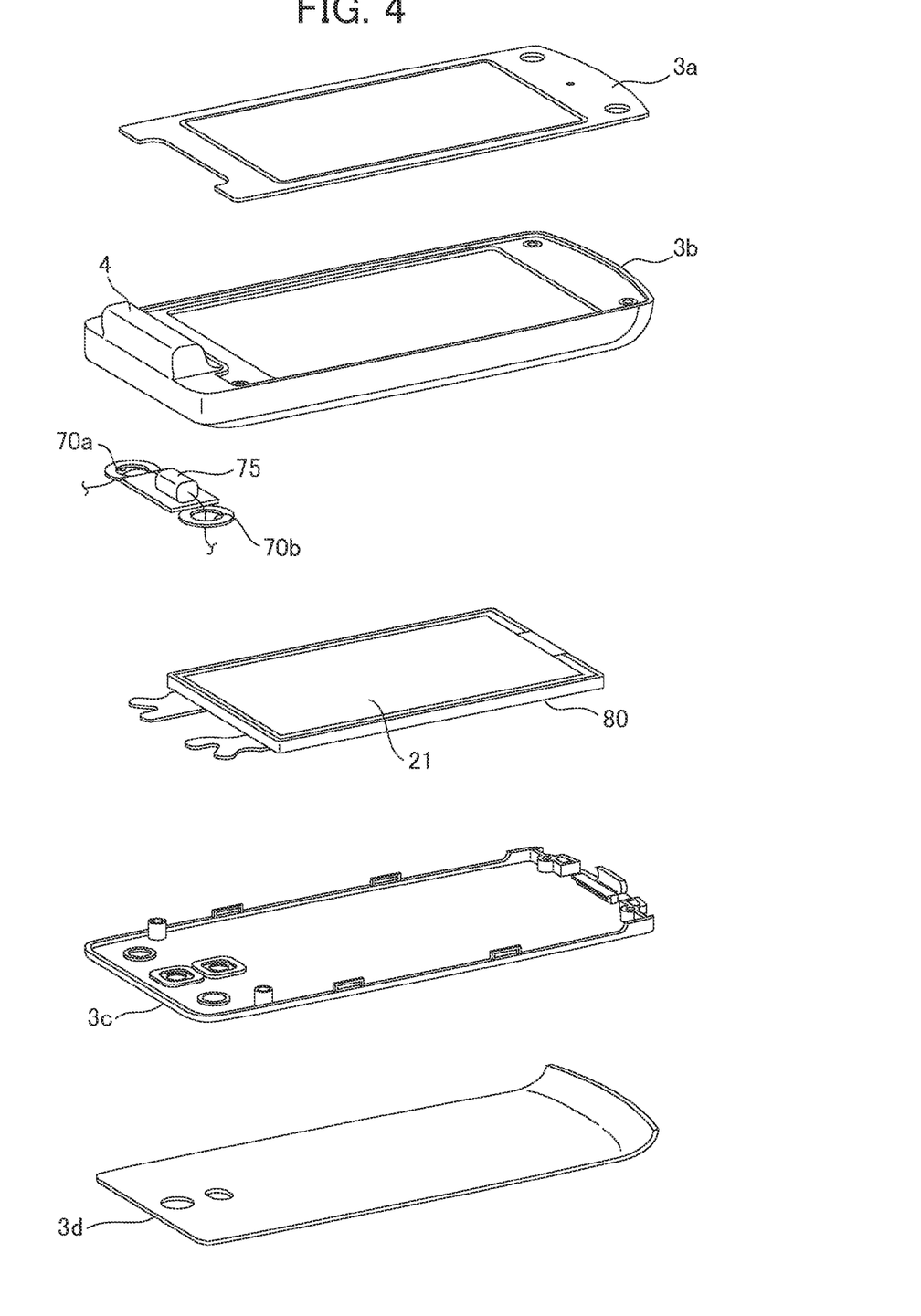
FIG. 4 is an exploded perspective view of members built into a display unit side body 3.

FIG. 4 is an exploded perspective view of members built into the display unit side body 3. As shown in FIG. 4, the display unit side body 3 includes: the front panel 3a; the front case 3b; the hinge mechanism 4; speakers 70a and 70b; a motor 75; the display 21; a printed circuit board 80 (first conductive portion) to which the display 21 is connected; the rear case 3c; and the rear panel 3d. Furthermore, the front panel 3a, the front case 3b, the display 21, the printed circuit board 80, the rear case 3c and the rear panel 3d are disposed to be stacked in the display unit side body 3.

As shown in FIG. 4, the front case 3b and the rear case 3c are disposed such that concave inner surfaces thereof face each other, and are connected such that peripheries thereof are superimposed with each other. Moreover, the display 21 and the printed circuit board 80 are built in and interposed between the front case 3b and the rear case 3c. In addition, the speakers 70a and 70b and the motor 75 are connected to the printed circuit board 80.

Figure 5:
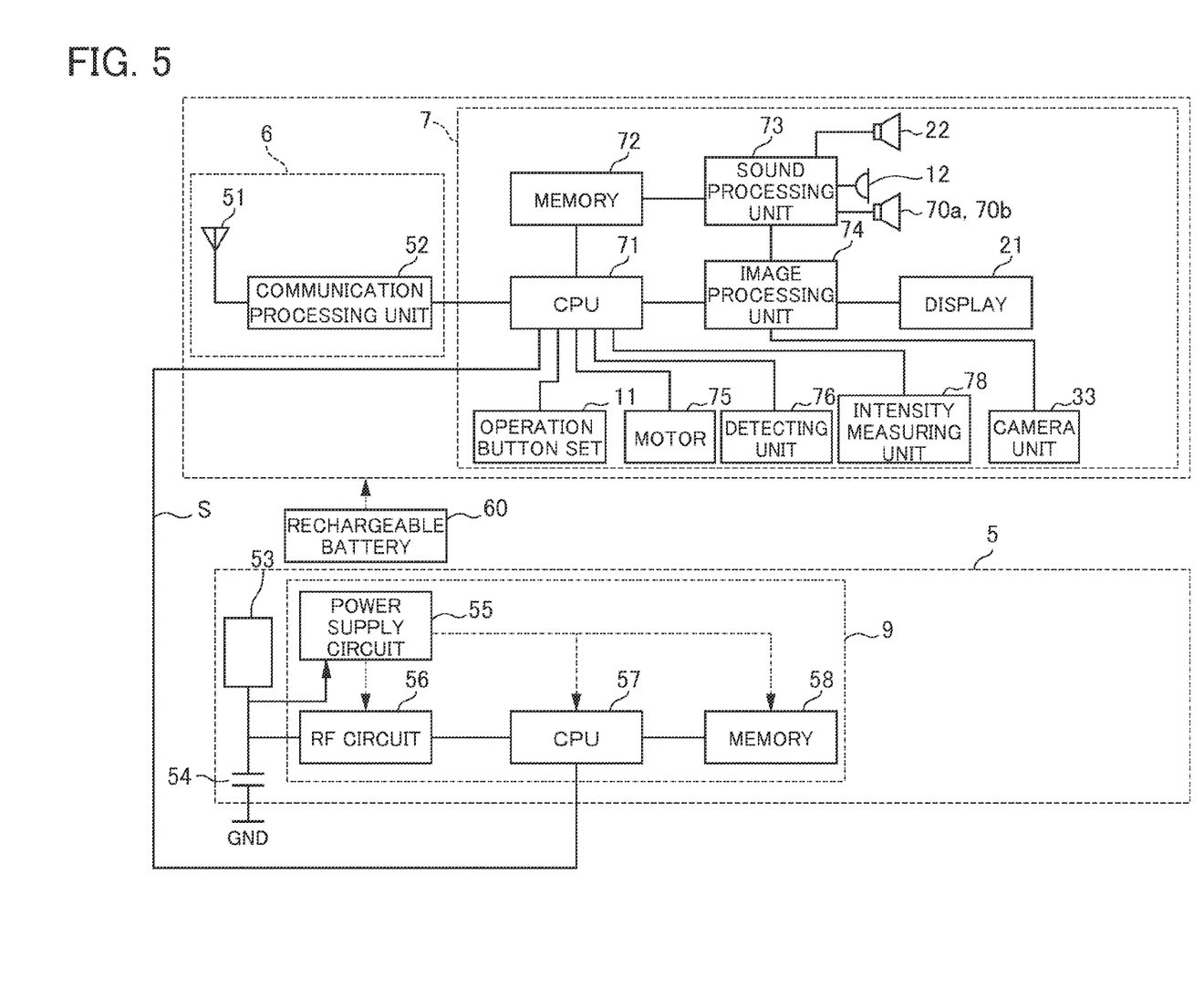
FIG. 5 is a block diagram showing features of the cellular telephone device 1 according to the present invention.

Moreover, FIG. 5 is a functional block diagram showing features of the cellular telephone device 1. As shown in FIG. 5, the cellular telephone device 1 includes: a second communication unit 5 as an RFID (Radio Frequency Identification) portion; a first communication unit 6 that communicates with external terminals; and a processing unit 7 that processes information communicated by the first communication unit 6.

Configuration of Second Communication Unit 5

The second communication unit 5 is composed of the RFID portion and includes an RFID chip 9, the magnetic field antenna 53 that communicates with external devices by way of the second usable frequency band (for example, 13.56 MHz), and a capacitor 54 for adjustment.

The magnetic field antenna 53 includes a coil wound in a multiple spiral shape on a sheet made of PET (polyethylene terephthalate) material, and receives a signal of the second usable frequency band transmitted from external devices. It should be noted that the magnetic field antenna 53 may be configured by winding a lead wire.

The RFID chip 9 includes: a power circuit 55 that generates a predetermined voltage based on electrical power induced by a signal received by the magnetic field antenna 53; an RF circuit 56 that performs signal processing such as modulation processing or demodulation processing with respect to a signal communicated by the magnetic field antenna 53; a CPU 57 that performs predetermined arithmetic processing; and memory 58 that stores predetermined data. The power circuit 55 is composed of a DC-DC converter, for example. In addition, the CPU 57 is connected to a CPU 71 to be described later via a signal line S, and information processed by the second communication unit 5 is transmitted to the CPU 71 via the signal line S.

Here, behavior of the second communication unit 5 is described. The magnetic field antenna portion 53, when approaching within a predetermined distance to a read/write device disposed outside thereof, receives a magnetic field transmitted from the read/write device (modulated with respect to a carrier frequency having the second usable frequency band (for example, 13.56 MHz)). It should be noted that, a predetermined adjustment (tuning) is made to the capacitor 54 so that the magnetic field of the second usable frequency band is transmitted to the RF circuit 56 via the magnetic field antenna 53.

In addition, an electromotive force is generated by an electromagnetic induction effect when the magnetic field is received by the magnetic field antenna 53. The power circuit 55 generates a predetermined power supply voltage from the electromotive force generated by the electromagnetic induction effect, and supplies the power supply voltage to the RF circuit 56, the CPU 57, and the memory 58. In addition, the RF circuit 56, the CPU 57, and the memory 58 are switched from a halt state to an active state when the predetermined power supply voltage is supplied from the power circuit 55.

The RF circuit 56 performs signal processing such as demodulation with respect to a signal of the second usable frequency band received via the magnetic field antenna 53, and transmits the processed signal to the CPU 57.

The CPU 57 writes or reads data to or from the memory 58, based on the signal received from the RF circuit 56. In a case of reading data from the memory 58, the CPU 57 transmits the data to the RF circuit 56. The RF circuit 56 performs signal processing such as modulation with respect to the data being read from the memory 58, and transmits the data to the external read/write device via the magnetic field antenna 53.

Furthermore, although the second communication unit 5 is described above to be of a so-called passive, induction field type (electromagnetic induction type) without a power source, the present invention is not limited thereto, and the second communication unit 5 can also be of a passive mutual induction type (electromagnetic coupling type) or a passive radiation field type (radio wave type), or an active type with a power source. In addition, an access method of the second communication unit 5 is described as a read/write type; however, the present invention is not limited thereto, and the access method can also be of a read-only type, a write-once type, and the like.

Configuration of First Communication Unit 6

Moreover, as shown in FIG. 5, the first communication unit 6 includes: a main antenna 51 that communicates with external devices by way of the first usable frequency band (first frequency band) that is higher than the second usable frequency band; and a communication processing unit 52 that includes an RF circuit and performs signal processing such as modulation processing or demodulation processing. In addition, the first communication unit 6 is powered by the rechargeable battery 60.

The main antenna 51 communicates with external devices by way of the first usable frequency band (for example, 800 MHz). It should be noted that, although 800 MHz is set as the first usable frequency band in the present embodiment, other frequency bands can also be used. In addition, the main antenna 51 can be configured as a so-called dual band compatible antenna that can accept, in addition to the first usable frequency band, a third usable frequency band (for example, 2 GHz), or as a multi-band compatible antenna that can further accept a fourth usable frequency band.

The communication processing unit 52 performs demodulation processing of a signal received by the main antenna 51, transmits the processed signal to the processing unit 7, performs modulation processing of a signal received from the processing unit 7, and transmits the processed signal to an external device via the main antenna 51.

Configuration of Processing Unit 7

As shown in FIG. 5, the processing unit 7 includes: the operation button set 11; the sound input unit 12; the display 21; the receiver 22; the CPU 71 that performs predetermined arithmetic processing; memory 72 that stores predetermined data; a sound processing unit 73 that performs predetermined sound processing; an image processing unit 74 that performs predetermined image processing; a motor 75 that vibrates at a constant frequency; a camera unit 33 that captures an image of an object; and speakers 70a and 70b that output ringtones and the like. In addition, the processing unit 7 is powered by the rechargeable battery 60. It should be noted that, as shown in FIG. 5, in the cellular telephone device 1, the CPU 57 and the CPU 71 are connected via the signal line S, information processed by the second communication unit 5 is transmitted to the CPU 71 via the signal line S, and processing is performed as necessary.

An object of the present invention is to improve the antenna gain of the main antenna 51 by actively utilizing the high-order resonance point of the magnetic field antenna 53.

Here, a specific configuration for achieving the aforementioned object is described hereinafter. It should be noted that, although the main antenna 51 and the magnetic field antenna 53 are described as being disposed in the operation unit side body 2 in the following, the present invention is not limited thereto, and for example, the main antenna 51 and the magnetic field antenna 53 may be disposed in the display unit side body 3, or the main antenna 51 may be disposed in one of the operation unit side body 2 and the display unit side body 3, while the magnetic field antenna 53 may be disposed in another one of the operation unit side body 2 and the display unit side body 3.

First Configuration

The cellular telephone device 1 includes: a signal line that electrically connects the printed circuit board 80 and the printed circuit board 50 via the inside of the hinge mechanism 4; and the main antenna 51 (first antenna), which is disposed in at least one of the display unit side body 3 and the operation unit side body 2, and which is electrically connected to the printed circuit board 80 or the printed circuit board 50. A metal member that is electrically connected to the printed circuit board 80 is disposed in the display unit side body 3, and the magnetic field antenna 53 (second antenna) that is capacitively coupled with the metal member or the printed circuit board 50 or the printed circuit board 80 is disposed in at least one of the display unit side body 3 and the operation unit side body 2 in the opened state. Moreover, the metal member corresponds to, for example, the speakers 70a and 70b, the motor 75, etc. It should be noted that the magnetic field antenna 53 may be capacitively coupled directly with the printed circuit board 80 without involving the metal member.

With such a configuration, according to the present invention, in the opened state, by capacitively coupling the magnetic field antenna 53 with the metal member or the printed circuit board 50 or the printed circuit board 80, a high-frequency ground level of the display unit side body 3 (first body) and the operation unit side body 2 (second body) can be stabilized. Therefore, by utilizing the magnetic field antenna 53, the sensitivity of the main antenna 51 can be enhanced, and the freedom of design with respect to inside the body can be improved.

Second Configuration

Furthermore, according to the present invention, it is preferable that the main antenna 51 is configured to transmit or receive a signal related to the first usable frequency band (first frequency band), and the high-order secondary resonance point of the magnetic field antenna 53 is included in the first usable frequency band.

With such a configuration, according to the present invention, the degree of the capacitive coupling between the metal member or the printed circuit board 80 and the magnetic field antenna 53 is increased, and thus the sensitivity of the main antenna 51 in the opened state can be further improved.

Third Configuration

Moreover, according to the present invention, the main antenna 51 may be configured to transmit or receive a signal related to the first usable frequency band, and the magnetic field antenna 53 may be configured to transmit or receive a signal related to the second usable frequency band (second frequency band) in which the high-order secondary resonance point is not included in the first usable frequency band. In addition, in this case, it is preferable that the cellular telephone device 1 has an adjusting unit for adjusting the second usable frequency band. The adjusting unit has a function that adjusts the second usable frequency band such that the high-order resonance point of the magnetic field antenna 53 is included in the first usable frequency band. It should be noted that specific configurations of the adjusting unit are later described in sections: Specific Configuration 1 of—Adjusting unit; and Specific Configuration 2 of—Adjusting unit.

With such a configuration, according to the present invention, by adjusting the high-order resonance point of the magnetic field antenna 53 under a certain condition, the degree of the capacitive coupling between the metal member or the printed circuit board 80 and the magnetic field antenna 53 is increased, and thus the sensitivity of the main antenna 51 can be improved.

Fourth Configuration

Furthermore, as shown in FIG. 5, the cellular telephone device 1 has a detecting unit 76 (detecting unit) that detects the opened state. With such a configuration, when the opened state is detected by the detecting unit 76, the adjusting unit adjusts the second usable frequency band such that the high-order resonance point of the magnetic field antenna 53 is included in the first usable frequency band.

With such a configuration, according to the present invention, in a state where the possibility is high to perform communication by utilizing the main antenna 51, i.e. in the opened state where the necessity is high to enhance the sensitivity of the main antenna 51, the degree of the capacitive coupling between the metal member or the printed circuit board 80 and the magnetic field antenna 53 is increased, and thus the sensitivity of the main antenna 51 can be improved. It should be noted that, according to the present invention, since the second usable frequency band is not adjusted in the closed state, it is possible to reduce deterioration of the magnetic field antenna 53 due to the adjustment of the magnetic field antenna 53 by way of the adjusting mean.

Fifth Configuration

Moreover, as shown in FIG. 5, the cellular telephone device 1 has the detecting unit 76 that detects the closed state. With such a configuration, when the closed state is detected by the detecting unit 76, the adjusting unit suppresses the adjustment.

With such a configuration, according to the present invention, while the second usable frequency band is being adjusted in the opened state in the fourth configuration, and when the opened state is switched to the closed state, the adjustment is suppressed. Therefore, the deterioration of the magnetic field antenna 53 due to the adjustment of the magnetic field antenna 53 by way of the adjusting unit can be reduced.

Sixth Configuration

In addition, the cellular telephone device 1 has the communication processing unit 52 (first controlling unit) that performs first predetermined control (for example, communication control when performing a telephone call or data communication via the main antenna 51), based on a signal related to the first usable frequency band that is transmitted or received via the main antenna 51 (see FIG. 5). With such a configuration, when the first predetermined control is performed by way of the communication processing unit 52, the adjusting unit adjusts the second usable frequency band such that the high-order resonance point of the magnetic field antenna 53 is included in the first usable frequency band.

With such a configuration, according to the present invention, in a state where the necessity is high to enhance the sensitivity of the main antenna 51 (in a state where the possibility is high to perform the first predetermined control by way of the communication processing unit 52), the degree of the capacitive coupling between the metal member or the printed circuit board 80 and the magnetic field antenna 53 is increased, and thus the sensitivity of the main antenna 51 can be improved.

Seventh Configuration

Furthermore, when the first predetermined control is suppressed by way of the communication processing unit 52, it is preferable that the adjusting unit suppresses the adjustment; in other words, it is preferable that the adjustment is not performed.

With such a configuration, according to the present invention, while the second usable frequency band is being adjusted in the sixth configuration, and when the state enters a state where the necessity is low to improve the sensitivity of the main antenna 51 (a state where the first predetermined control is being suppressed by way of the communication processing unit 52), the adjustment by way of the adjusting unit is suppressed. Therefore, the deterioration of the magnetic field antenna 53 due to the adjustment of the magnetic field antenna 53 by way of the adjusting unit can be reduced.

Eighth Configuration

Moreover, as shown in FIG. 5, the cellular telephone device 1 has an intensity measuring unit 78 (first intensity measuring unit) that measures intensity of a signal related to the first usable frequency band that is transmitted or received via the main antenna 51. With such a configuration, when the intensity measuring unit 78 measures intensity with a value higher than a predetermined value, the adjusting unit adjusts the second usable frequency band such that the high-order resonance point of the magnetic field antenna 53 is included in the first usable frequency band.

With such a configuration, according to the present invention, in a state where the necessity is high to enhance the sensitivity of the main antenna 51 (in a state where the intensity measuring unit 78 measures intensity with a value higher than a predetermined value, in which the possibility is high to perform communication by using the main antenna 51), the degree of the capacitive coupling between the metal member or the printed circuit board 80 and the magnetic field antenna 53 is increased, and thus the sensitivity of the main antenna 51 can be improved.

Ninth Configuration

In addition, when the intensity measuring unit 78 measures intensity with a value lower than a predetermined value, it is preferable that the adjusting unit suppresses the adjustment; in other words, it is preferable that the adjustment is not performed.

With such a configuration, according to the present invention, while the second usable frequency band is being adjusted in the eighth configuration, and when the state enters a state where the necessity is low to improve the sensitivity of the main antenna 51 (a state where the intensity measuring unit 78 measures intensity with a value lower than a predetermined value, in which the possibility is low to perform communication by using the main antenna 51), the adjustment is suppressed. Therefore, the deterioration of the magnetic field antenna 53 due to the adjustment of the magnetic field antenna 53 by way of the adjusting unit can be reduced.

Tenth Configuration

The cellular telephone device 1 has the intensity measuring unit 78 that measures intensity of a signal related to the first usable frequency band that is transmitted or received via the main antenna 51. With such a configuration, when the intensity measuring unit 78 measures intensity with a value lower than a predetermined value, the adjusting unit adjusts the second usable frequency band such that the high-order resonance point of the magnetic field antenna 53 is included in the first usable frequency band.

With such a configuration, according to the present invention, for example, in a case in which the radio wave condition of the main antenna 51 is poor, by performing adjustment such that the high-order resonance point of the magnetic field antenna 53 is included in the first usable frequency band, the degree of the capacitive coupling between the metal member or the printed circuit board 80 and the magnetic field antenna 53 is increased, and thus the sensitivity of the main antenna 51 can be improved.

Eleventh Configuration

When the intensity measuring unit 78 measures intensity with a value higher than a predetermined value, it is preferable that the adjusting unit suppresses the adjustment; in other words, it is preferable that the adjustment is not performed.

With such a configuration, according to the present invention, while the second usable frequency band is being adjusted in the tenth configuration, and when the sensitivity condition of the main antenna 51 is improved, the adjustment is suppressed; therefore, wasteful power consumption can be suppressed, and in addition, the deterioration of the magnetic field antenna 53 due to the adjustment of the magnetic field antenna 53 by way of the adjusting unit can be reduced.

Twelfth Configuration

The RFID chip 9 (second controlling unit) is provided, which performs second predetermined control (for example, communication control when performing communication via the magnetic field antenna 53) based on a signal related to the second usable frequency band that is transmitted or received via the magnetic field antenna 53. With such a configuration, in a state where the second predetermined control by way of the RFID chip 9 is not being performed, the adjusting unit adjusts the second usable frequency band such that the high-order resonance point of the magnetic field antenna 53 is included in the first usable frequency band.

With such a configuration, in a state where the necessity is low to improve the sensitivity of the magnetic field antenna 53 (in a state where the second predetermined control performed by the RFID chip 9 is suppressed, for example, in a state where the RFID chip 9 is not used), the adjustment is performed. Therefore, since the adjusting unit performs adjustment in a state where the necessity is low to improve the sensitivity of the magnetic field antenna 53, the degree of the capacitive coupling between the metal member or the printed circuit board 80 and the magnetic field antenna 53 is increased, and thus the sensitivity of the main antenna 51 can be improved.

Thirteenth Configuration

In a state where the second predetermined control by way of the RFID chip 9 is being performed, it is preferable that the adjustment is suppressed; in other words, it is preferable that the adjustment is not performed.

With such a configuration, according to the present invention, while the second usable frequency band is being adjusted in the twelfth configuration, and when the state enters a state where the necessity is high to improve the sensitivity of the magnetic field antenna 53 (a state where the second predetermined control has been performed by way of the RFID chip 9), the adjustment is suppressed. Therefore, the deterioration of the magnetic field antenna 53 due to the adjustment of the magnetic field antenna 53 by way of the adjusting unit can be reduced.

Fourteenth Configuration

Moreover, as shown in FIG. 5, the cellular telephone device 1 has an intensity measuring unit 78 (second intensity measuring unit) that measures intensity of a signal related to the second usable frequency band that is transmitted or received via the magnetic field antenna 53. With such a configuration, when the intensity measuring unit 78 measures intensity with a value lower than a predetermined value, the adjusting unit adjusts the second usable frequency band such that the high-order resonance point of the magnetic field antenna 53 is included in the first usable frequency band. It should be noted that, in the present embodiment, the intensity measuring unit 78 measures intensity of a signal related to the first usable frequency band from the main antenna 51, and measures the second usable frequency band from the magnetic field antenna 53; however, it is not limited thereto, and the intensity measuring unit 78 may be exclusively provided for each of the antennas.

With such a configuration, according to the present invention, in a state where the necessity is low to enhance the sensitivity of the magnetic field antenna 53 (in a state where magnetic field communication via the magnetic field antenna 53 is not performed), the degree of the capacitive coupling between the metal member or the printed circuit board 80 and the magnetic field antenna 53 is increased, and thus the sensitivity of the main antenna 51 can be preferentially improved.

Fifteenth Configuration

When the intensity measuring unit 78 measures intensity with a value higher than a predetermined value, it is preferable that the adjusting unit suppresses the adjustment; in other words, it is preferable that the adjustment is not performed.

With such a configuration, according to the present invention, while the second usable frequency band is being adjusted in the fourteenth configuration, and in a state where magnetic field communication is performed by using the magnetic field antenna 53, the adjustment is suppressed. Therefore, the deterioration of the magnetic field antenna 53 due to the adjustment of the magnetic field antenna 53 by way of the adjusting unit can be reduced.

Sixteenth Configuration

In addition, as shown in FIG. 5, the cellular telephone device 1 has an intensity measuring unit 78 that measures intensity of a signal related to the second usable frequency band that is transmitted or received via the magnetic field antenna 53. With such a configuration, when the intensity measuring unit 78 measures intensity with a value higher than a predetermined value, the adjusting unit adjusts the second usable frequency band such that the high-order resonance point of the magnetic field antenna 53 is included in the first usable frequency band.

With such a configuration, according to the present invention, in a state where the sensitivity of the magnetic field antenna 53 is satisfactory, adjustment is actively performed by way of the adjusting unit. As a result, the degree of the capacitive coupling between the metal member or the printed circuit board 80 and the magnetic field antenna 53 is increased, and thus the sensitivity state of the main antenna 51 can be made satisfactory.

Seventeenth Configuration

When the intensity measuring unit 78 measures intensity with a value lower than a predetermined value, it is preferable that the adjusting unit suppresses the adjustment; in other words, it is preferable that the adjustment is not performed.

With such a configuration, according to the present invention, while the second usable frequency band is being adjusted in the sixteenth configuration, and in a state where the intensity measuring unit 78 measures intensity with a value lower than a predetermined value, i.e. in a case in which the necessity is decreased to perform magnetic field communication via the magnetic field antenna, the adjustment is suppressed; therefore, the deterioration of the sensitivity of the main antenna 51 can be suppressed.

Eighteenth Configuration

It is preferable that the main antenna 51 and the magnetic field antenna 53 are disposed in different bodies. With such a configuration, the physical distance between the main antenna 51 and the magnetic field antenna 53 can be increased, and disadvantage due to close disposition of the main antenna 51 and the magnetic field antenna 53 can be avoided.

Specific Configuration 1 of Adjusting Unit

A specific configuration of the adjusting unit that shifts the high-order resonance point of the magnetic field antenna 53 to the usable frequency band of the main antenna 51 is described below.

Figure 6:
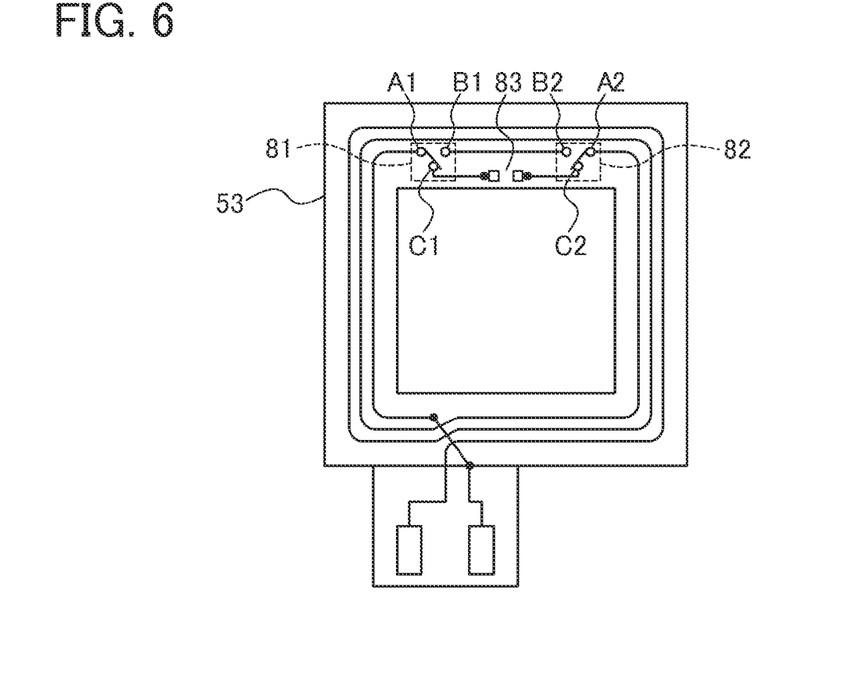
FIG. 6 is a diagram showing a first configuration of a magnetic field antenna 53 provided in the cellular telephone device 1 according to the present invention.

As shown in FIG. 6, in order to adjust the frequency characteristics of the main antenna 51, the cellular telephone device 1 is configured such that, under a controlled condition, the connection paths of the antenna pattern of the magnetic field antenna 53 can be changed by switching, and the inductance value of the magnetic field antenna 53 can be appropriately changed.

The magnetic field antenna 53 is configured such that a first switch unit 81, a second switch unit 82, and a lumped constant circuit 83 (adjusting unit) are added on one side thereof to the wiring pattern, and thus it is possible to select from the first path and the second path.

The first switch unit 81 is configured with a terminal A1, a terminal B1 and a terminal C1; and the second switch unit 82 is configured with a terminal A2, a terminal B2 and a terminal C2.

The lumped constant circuit 83 is configured with, for example, a phase rotation element such as a coil and a parallel resonant circuit; one end side thereof is connected to the terminal C1 of the first switch unit 81; and another end side thereof is connected to the terminal C2 of the second switch unit 82. It should be noted that, although the lumped constant circuit 83 is added in the present embodiment, it may be another component as long as the inductance value can be changed, and a configuration may be employed, in which, for example, ferrite, etc. are added.

Under a controlled condition, the CPU 71 (control unit) controls the first switch unit 81 and the second switch unit 82, conducts electricity between the terminal A1 and the terminal B1, and conducts electricity between the terminal A2 and the terminal B2, thereby configuring the first path. On the other hand, the CPU 71 conducts electricity between the terminal A1 and the terminal C1, and conducts electricity between the terminal A2 and the terminal C2, thereby configuring the second path that is connected via the lumped constant circuit 83.

Here, the first path is a path, of which communication quality and communication electrical efficiency are the best in the second communication unit 5. Moreover, the second path is a path through the lumped constant circuit 83, and is configured in this state such that the inductance value of the magnetic field antenna 53 is changed, and the high-order resonance point of the magnetic field antenna 53 overlaps with the usable frequency band of the main antenna 51. Therefore, in a case in which the second path is selected, the gain of the main antenna 51 can be improved by way of the high-order resonance point of the magnetic field antenna 53. It should be noted that the magnetic field antenna 53 is within the range of specification that can perform communication with an external device by way of the second usable frequency band, even if the second path is selected.

It should be noted that, in FIG. 6, the second path that is configured with the first switch unit 81, the second switch unit 82 and the lumped constant circuit 83 is illustrated as being added to only some lines that configure the magnetic field antenna 53; however, it is not limited thereto, and a configuration may be employed in which the second path is added to all the lines.

Specific Configuration 2 of Adjusting Unit

Figure 7:
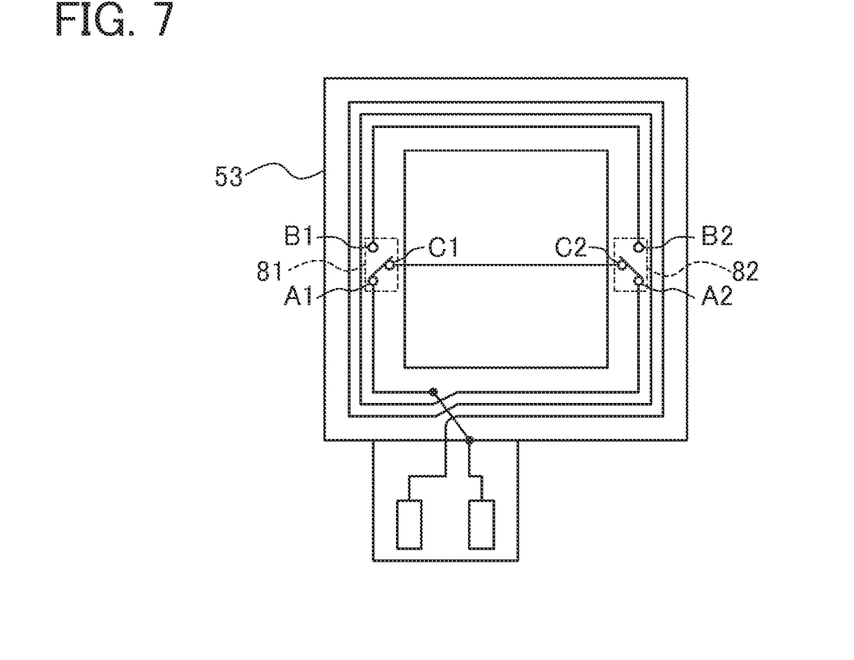
FIG. 7 is a diagram showing a second configuration of the magnetic field antenna 53 provided in the cellular telephone device 1 according to the present invention.

In addition, the cellular telephone device 1 may have a configuration other than the aforementioned configuration (FIG. 6); and for example, as shown in FIG. 7, the first switch unit 81 and the second switch unit 82 are provided to predetermined positions of lines that configure the magnetic field antenna 53, respectively. Furthermore, under a controlled condition, the CPU 71 controls the first switch unit 81 and the second switch unit 82, conducts electricity between the terminal A1 and the terminal B1, and conducts electricity between the terminal A2 and the terminal B2, thereby configuring the first path. On the other hand, the CPU 71 controls the first switch unit 81 and the second switch unit 82, conducts electricity between the terminal A1 and the terminal C1, and conducts electricity between the terminal A2 and the terminal C2, thereby configuring the second path. In this way, a configuration may be employed, in which the element length (inductance value) of the magnetic field antenna 53 is changed between a case of the first path and a case of the second path.

With such a configuration, when the first path is selected, communication via the magnetic field antenna 53 can be favorably performed. Moreover, when the second path is selected, the high-order resonance point of the magnetic field antenna 53 overlaps with the usable frequency band of the main antenna 51. Therefore, the gain of the main antenna 51 can be improved.

Disposition Relationship of Magnetic Field Antenna 53 and Metal Member

Figure 8:
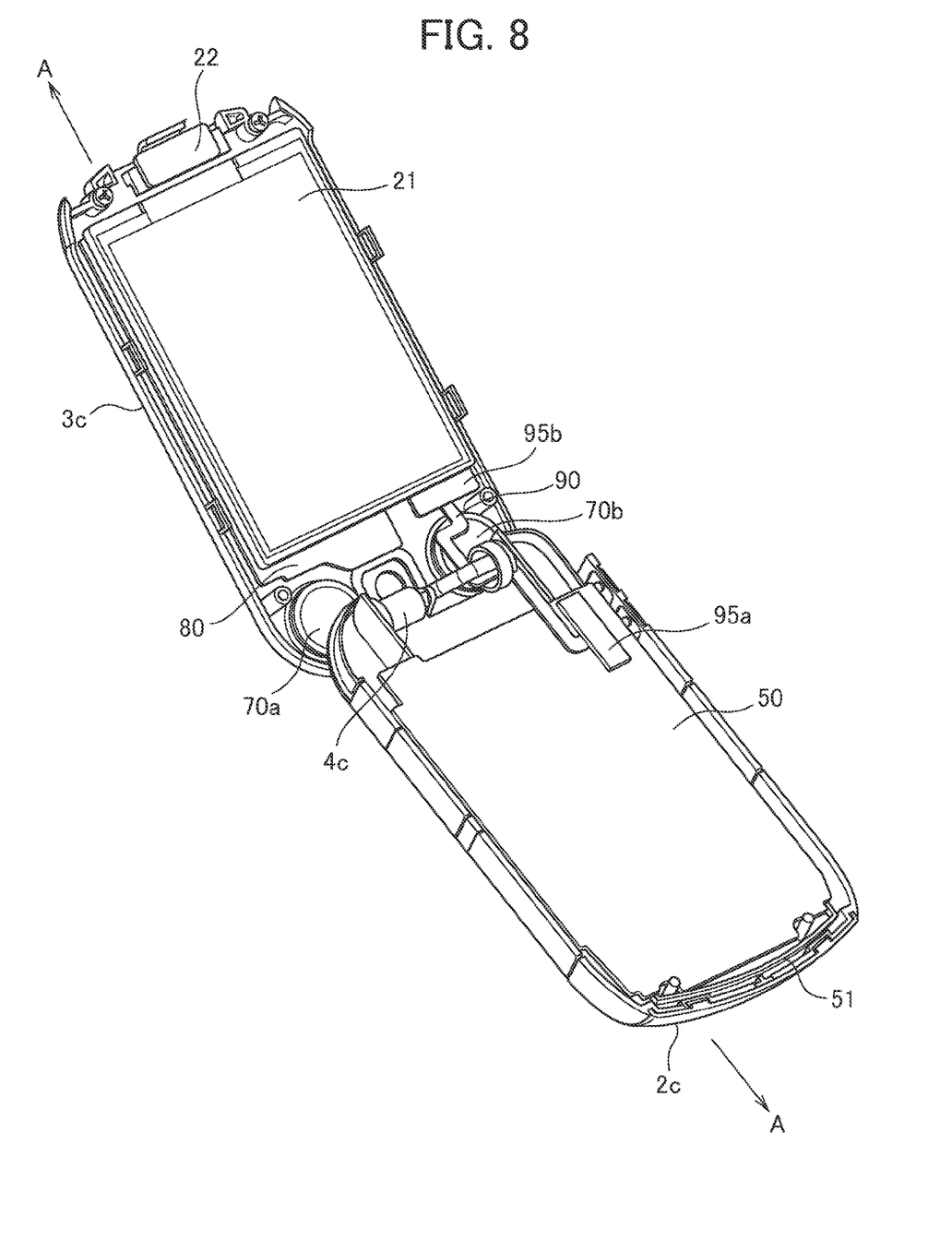
FIG. 8 is a perspective view showing an inside of the cellular telephone device 1 as a first embodiment of a cellular telephone device according to the present invention, communicating with a host device.

Here, FIG. 8 is a first perspective view showing an inside of the cellular telephone device 1 according to the first embodiment. As shown in FIG. 8, the printed circuit board 50 is disposed on the rear case 2c of the operation unit side body 2; and the printed circuit board 80 and the display 21 are disposed on the rear case 3c of the display unit side body 3.

The main antenna 51 for receiving a radio wave is disposed between the rear case 2c and the printed circuit board 50 of the operation unit side body 2. The receiver 22 for producing received sound is disposed between the rear case 3c and the printed circuit board 80 of the display unit side body 3. In addition, the speakers 70a and 70b (metal members), which have conductive portions such as metals, and which are electrically connected to the printed circuit board 80, are disposed between the rear case 3c and the printed circuit board 80, which are the opposite side from the receiver 22 in the display unit side body 3.

Furthermore, one end of a coaxial cable 90, which is inserted through the hinge mechanism 4, and which is composed of a plurality of signal lines and shielded lines, is connected to the printed circuit board 50 of the operation unit side body 2 via a connector 95a. Another end of the coaxial cable 90 is connected to the printed circuit board 80 of the display unit side body 3 via the connector 95b. Moreover, on one end opposite from the main antenna 51 disposed in the operation unit side body 2, a metal hinge 4c (metal member) that configures the hinge mechanism 4a shown in FIG. 3 is disposed in a position facing the speakers 70a and 70b. The metal hinge 4c is electrically connected to the printed circuit board 50. It should be noted that a pseudo-metal hinge that is produced by depositing metal on an inner surface of a non-conductive hinge made of plastic, resin, etc. may be used as the metal hinge 4c.

Figure 9:
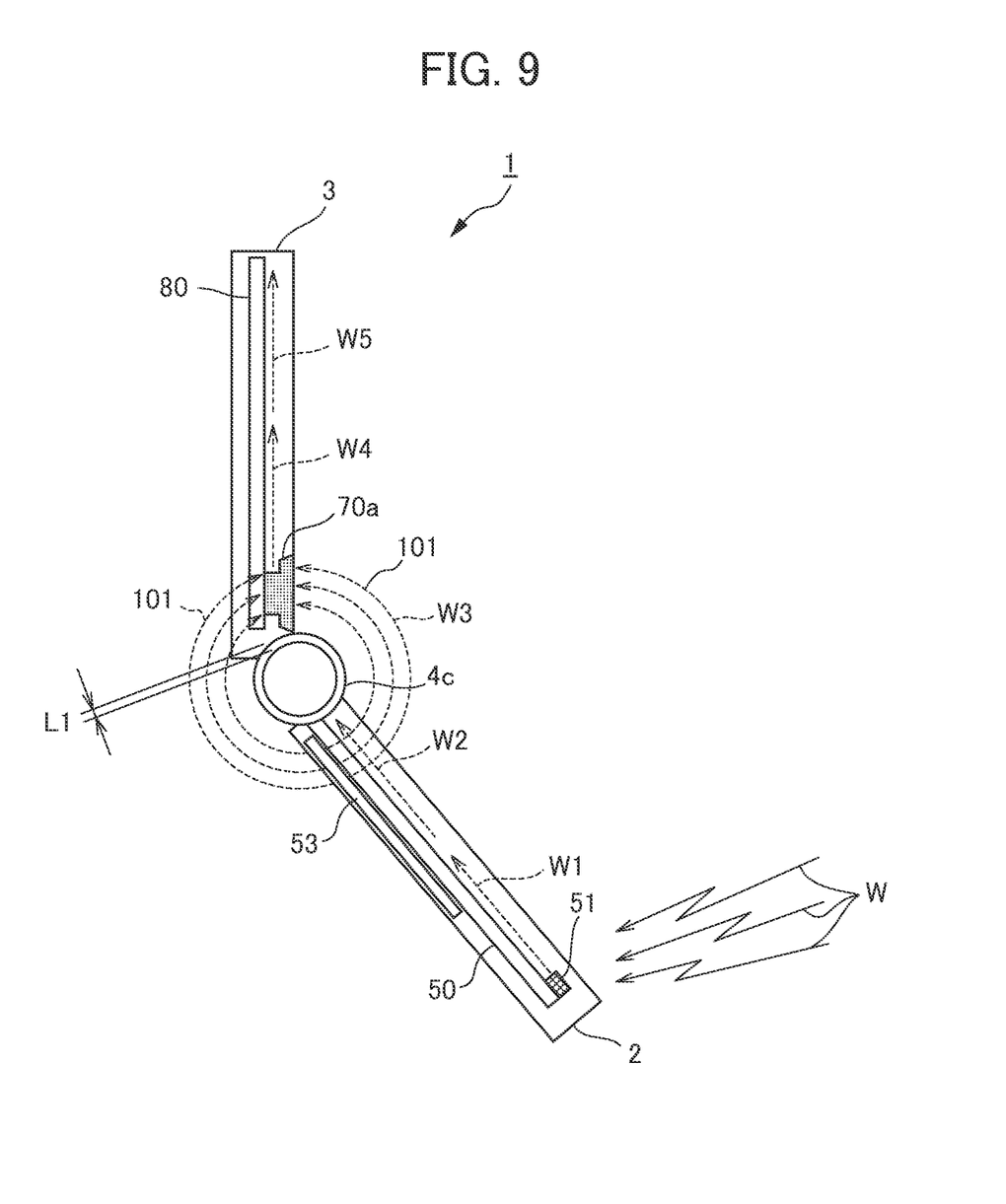
FIG. 9 is a cross-sectional view of the cellular telephone device 1 cut along a line A-A shown in FIG. 8.

Characteristic operation and effect in the cellular telephone device 1 of the present embodiment are hereinafter described with reference to FIG. 9. As shown in FIG. 9, capacitive coupling is established among the magnetic field antenna 53, the metal hinge 4c and the speaker 70a. An incoming wave W, which is an incoming radio wave propagated through the air from a host device, is resonated via the main antenna 51 that is provided in the cellular telephone device 1, thereby inducing a high-frequency current to form an electric line of force 101. Accordingly, the high-frequency current induced by the incoming wave W is propagated from the main antenna 51 to the printed circuit board 50, the magnetic field antenna 53, the speakers 70a and 70b, and the printed circuit board 80, thereby forming a high frequency electrical ground. Schematic aspects at this time are shown as high-frequency currents W1, W2, W3, W4 and W5 in FIG. 9.

With such a configuration, according to the present invention, the gain of the main antenna 51 can be improved without hindering freedom of design.

In addition, although the aforementioned embodiments were described in which capacitive coupling is directly established between the metal member (the speakers 70a and 70b, etc.) disposed in the display unit side body 3 and the magnetic field antenna 53 disposed in the operation unit side body 2, it is not limited thereto. A configuration may be employed, in which indirect capacitive coupling is established between the metal member and the magnetic field antenna 53 (for example, a configuration in which capacitive coupling is established between the magnetic field antenna 53 and the hinge mechanism 4 that configures the metal member, and capacitive coupling is established between the metal member that configures the hinge mechanism 4 and the metal member (speakers 70a and 70b) disposed in the display unit side body 3).

The invention claimed is:

1. A communication device, comprising:
a first body;
a second body;
a connecting portion that connects the first body and the second body, so as to be capable of switching between a closed state in which the first body and the second body are superimposed with each other, and an opened state in which a degree of mutual superimposition is smaller than that of the closed state;
a first conductive portion that is disposed in the first body;
a second conductive portion that is disposed in the second body;
a signal line that electrically connects the first conductive portion and the second conductive portion via the inside of the connecting portion;
a first antenna, which is disposed in at least one of the first body and the second body, and which is electrically connected to the first conductive portion or the second conductive portion; and
a second antenna, which is disposed in at least one of the first body and the second body, and which is capacitively coupled with the first conductive portion or the second conductive portion, wherein
a high frequency current induced by the first antenna is propagated through the first conductive portion, the second antenna and the second conductive portion.

2. The communication device according to claim 1,
wherein the first antenna is configured to transmit or receive a signal related to a first frequency band, and
wherein a high-order secondary resonance point of the second antenna is included in the first frequency band.

3. The communication device according to claim 1,
wherein the first antenna is configured to transmit or receive a signal related to a first frequency band,
wherein the second antenna is configured to transmit or receive a signal related to a second frequency band of which high-order secondary resonance point is not included in the first frequency band,
wherein the communication device comprises an adjusting unit that performs adjustment of the second frequency band, and
wherein the adjusting unit performs adjustment of the second frequency band such that a high-order resonance point of the second antenna is included in the first frequency band.

4. The communication device according to claim 3, comprising:
a detecting unit that detects the opened state,
wherein, when the detecting unit detects the opened state, the adjusting unit performs adjustment of the second frequency band such that the high-order resonance point of the second antenna is included in the first frequency band.

5. The communication device according to claim 4,
wherein the detecting unit detects the closed state,
wherein, when the detecting unit detects the closed state, the adjusting unit suppresses the adjustment.

6. The communication device according to claim 3, comprising:
a first controlling unit that performs first predetermined control based on the signal related to the first frequency band transmitted or received via the first antenna,
wherein, when the first controlling unit performs the first predetermined control, the adjusting unit performs adjustment of the second frequency band such that the high-order resonance point of the second antenna is included in the first frequency band.

7. The communication device according to claim 6,
wherein, when the first controlling unit suppresses the first predetermined control, the adjusting unit suppresses the adjustment.

8. The communication device according to claim 3, comprising:
a first intensity measuring unit that measures intensity of the signal related to the first frequency band transmitted or received via the first antenna,
wherein, when the first intensity measuring unit measures intensity with a value higher than a predetermined value, the adjusting unit performs adjustment of the second frequency band such that the high-order resonance point of the second antenna is included in the first frequency band.

9. The communication device according to claim 8,
wherein, when the first intensity measuring unit measures intensity with a value lower than a predetermined value, the adjusting unit suppresses the adjustment.

10. The communication device according to claim 3, comprising:
a first intensity measuring means unit that measures intensity of the signal related to the first frequency band transmitted or received via the first antenna,
wherein, when the first intensity measuring unit measures intensity with a value lower than a predetermined value, the adjusting unit performs adjustment of the second frequency band such that the high-order resonance point of the second antenna is included in the first frequency band.

11. The communication device according to claim 10,
wherein, when the first intensity measuring unit measures intensity with a value higher than a predetermined value, the adjusting unit suppresses the adjustment.

12. The communication device according to claim 3, comprising:
a second controlling unit that performs second predetermined control based on the signal related to the second frequency band transmitted or received via the second antenna,
wherein, in a state in which the second controlling unit is not performing the second predetermined control, the adjusting unit performs adjustment of the second frequency band such that the high-order resonance point of the second antenna is included in the first frequency band.

13. The communication device according to claim 12,
wherein, in a state in which the second controlling unit is performing the second predetermined control, the adjusting unit suppresses the adjustment.

14. The communication device according to claim 3, comprising:
a second intensity measuring unit that measures intensity of the signal related to the second frequency band transmitted or received via the second antenna,
wherein, when the second intensity measuring unit measures intensity with a value lower than a predetermined value, the adjusting unit performs adjustment of the second frequency band such that the high-order resonance point of the second antenna is included in the first frequency band.

15. The communication device according to claim 14, wherein, when the second intensity measuring unit measures intensity with a value higher than a predetermined value, the adjusting unit suppresses the adjustment.

16. The communication device according to claim 3, comprising:
   a second intensity measuring unit that measures intensity of the signal related to the second frequency band transmitted or received via the second antenna,
   wherein, when the second intensity measuring unit measures intensity with a value higher than a predetermined value, the adjusting unit performs adjustment of the second frequency band such that the high-order resonance point of the second antenna is included in the first frequency band.

17. The communication device according to claim 16, wherein, when the second intensity measuring unit measures intensity with a value lower than a predetermined value, the adjusting unit suppresses the adjustment.

18. The communication device according to claim 1, wherein the first antenna is disposed in the first body.

* * * * *